(12) United States Patent
Hirayama et al.

(10) Patent No.: US 11,731,173 B2
(45) Date of Patent: Aug. 22, 2023

(54) CLEANING APPARATUS AND CONTROL METHOD FOR CLEANING APPARATUS

(71) Applicant: CANON KABUSHIKI KAISHA, Tokyo (JP)

(72) Inventors: Keita Hirayama, Yokohama (JP); Gou Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 16/512,115

(22) Filed: Jul. 15, 2019

(65) Prior Publication Data
US 2020/0030857 A1    Jan. 30, 2020

(30) Foreign Application Priority Data

Jul. 30, 2018  (JP) ................................ 2018-142902

(51) Int. Cl.
| | |
|---|---|
| *B08B 5/02* | (2006.01) |
| *G03B 17/56* | (2021.01) |
| *B08B 13/00* | (2006.01) |
| *G02B 27/00* | (2006.01) |

(52) U.S. Cl.
CPC ............... *B08B 5/02* (2013.01); *B08B 13/00* (2013.01); *G03B 17/56* (2013.01); *G02B 27/0006* (2013.01)

(58) Field of Classification Search
CPC .......... B08B 5/02; B08B 13/00; B08B 1/006; G03B 17/56; G02B 27/0006; A47L 1/02
See application file for complete search history.

(56) References Cited

U.S. PATENT DOCUMENTS

| | | | | |
|---|---|---|---|---|
| 7,222,388 | B2 * | 5/2007 | Sugihara ................ | G03B 17/56 15/310 |
| 7,697,063 | B2 * | 4/2010 | Sugihara ................ | G03B 17/56 348/375 |
| 8,013,933 | B2 * | 9/2011 | Sugihara ................ | G03B 17/56 348/375 |
| 11,089,185 | B2 * | 8/2021 | Sakamaki ................ | B08B 1/00 |
| 11,344,921 | B2 * | 5/2022 | Sato .................... | G02B 27/0006 |

(Continued)

FOREIGN PATENT DOCUMENTS

| | | |
|---|---|---|
| CN | 101138766 A | 3/2008 |
| CN | 106493096 A | 3/2017 |

(Continued)

*Primary Examiner* — Alexander Markoff
(74) *Attorney, Agent, or Firm* — Canon U.S.A., Inc. I.P. Division

(57) ABSTRACT

A cleaning apparatus that cleans a detection element including a detection surface, including a first cleaner configured to perform cleaning, and configured to clean the detection surface by using a first cleaning portion, a second cleaner, and configured to clean the detection surface by using a second cleaning portion, a driver to which the first cleaner and the second cleaner are attached and configured to move to approach or recede from the detection surface in a state where the first cleaner and the second cleaner are attached to the driver, and a control unit configured to control each of the first cleaner, the second cleaner, and the driver, wherein the control unit controls, based on the received setting, a cleaning order and/or a number of cleaning operations of the cleaning performed by the first cleaner and the cleaning performed by the second cleaner.

17 Claims, 12 Drawing Sheets

(56) References Cited

U.S. PATENT DOCUMENTS

| | | | |
|---|---|---|---|
| 11,457,690 B2* | 10/2022 | Edge | A43B 7/1464 |
| 11,516,371 B2* | 11/2022 | Mizutani | B08B 1/006 |
| 11,556,003 B2* | 1/2023 | Arakawa | B08B 1/04 |
| 2004/0103916 A1 | 6/2004 | Davis | |
| 2004/0200027 A1* | 10/2004 | Sugihara | G03B 17/56 |
| | | | 15/301 |
| 2005/0052759 A1 | 3/2005 | Ito | |
| 2006/0207290 A1 | 9/2006 | Ide | |
| 2010/0149411 A1* | 6/2010 | Sugihara | G03B 17/56 |
| | | | 348/375 |
| 2011/0266375 A1 | 11/2011 | Ono | |
| 2014/0060582 A1* | 3/2014 | Hartranft | G03B 17/08 |
| | | | 348/148 |
| 2016/0001330 A1* | 1/2016 | Romack | H04N 23/63 |
| | | | 348/148 |
| 2017/0036647 A1* | 2/2017 | Zhao | G02B 27/0006 |
| 2020/0030857 A1* | 1/2020 | Hirayama | B08B 5/02 |
| 2020/0033593 A1* | 1/2020 | Mizutani | B08B 6/00 |
| 2020/0033594 A1* | 1/2020 | Arakawa | B08B 1/04 |
| 2020/0036870 A1* | 1/2020 | Sato | B08B 1/008 |
| 2020/0307525 A1* | 10/2020 | Sparbert | B60S 1/52 |
| 2020/0346255 A1* | 11/2020 | Robertson, Jr. | B06B 1/0633 |

FOREIGN PATENT DOCUMENTS

| | | | |
|---|---|---|---|
| CN | 107271453 A | 10/2017 | |
| CN | 107405651 A | 11/2017 | |
| CN | 107716363 A | 2/2018 | |
| JP | 2001-075241 A | 3/2001 | |
| JP | 4537105 B2 | 9/2010 | |

* cited by examiner

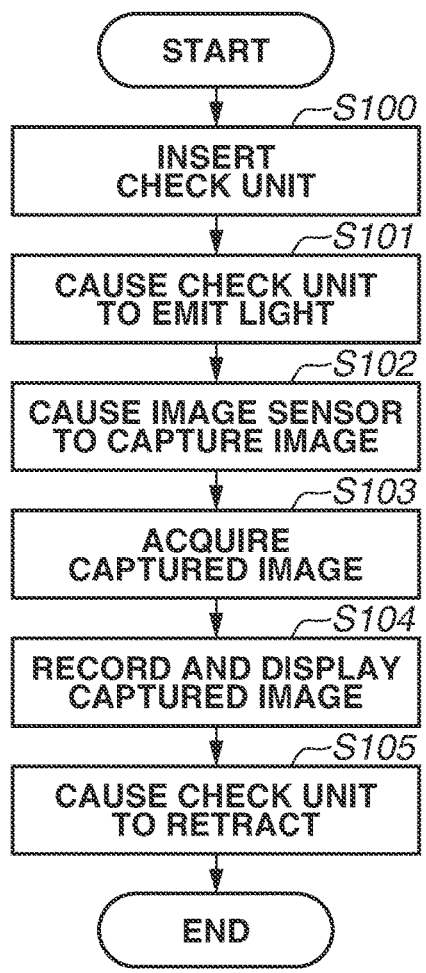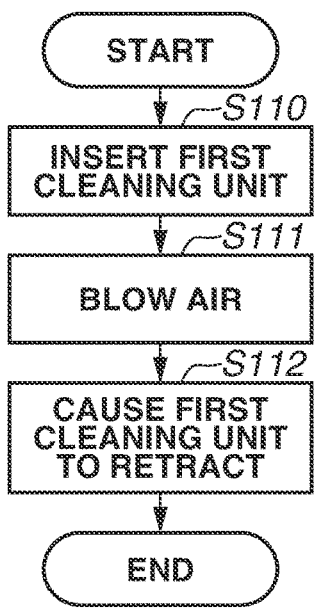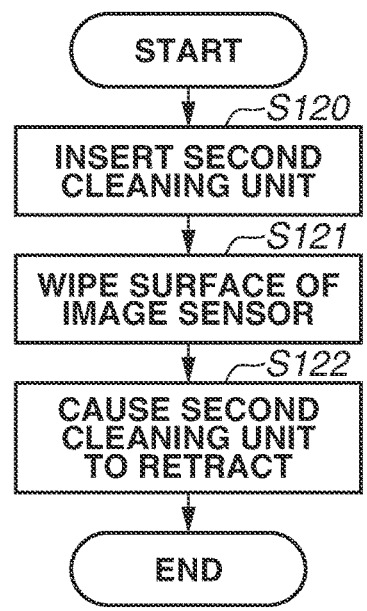

FIG.6C

| Remaining cleaning count | Remaining amount of cloth |
|---|---|
| About 6 times (FULL size) | 1.1 m |
| Temp. (PC) | Temp. (Cleaner area) | Air pressure |
| 25.9 deg C | 26.8 deg C | 0.587 MPa |

FIG.6D

| Camera II | |
|---|---|
| Total cleaning count | Today's cleaning count |
| 128 times | 0 times |

CLEANING APPARATUS AND CONTROL METHOD FOR CLEANING APPARATUS

BACKGROUND OF THE INVENTION

Field of the Invention

The present invention relates to a cleaning apparatus that cleans a detection surface of a detection element that detects a physical quantity of light, electromagnetic waves, or the like, and a cleaning method for the cleaning apparatus.

Description of the Related Art

There is an issue that an erroneous detection occurs due to foreign particles adhering to a detection surface of a detection element that detects light, electromagnetic waves, or the like. For example, in a digital camera including an image sensor having a configuration in which photoelectric converters serving as light-receiving elements are two-dimensionally arranged, an image capturing surface (photoelectric conversion surface) of the image sensor is periodically cleaned to thereby prevent a deterioration in the quality of an image to be obtained. However, if a user cleans the image capturing surface by himself/herself, there is a possibility that the image capturing surface may be accidentally damaged. Accordingly, in general, a user takes an image sensor in a service store run by a manufacturer or the like and ask a dedicated worker to clean the image capturing surface of the image sensor. However, the accuracy of cleaning work varies depending on the difference in the proficiency level or the like of dedicated workers. In this regard, Japanese Patent No. 04537105 discusses an apparatus that is connected to a camera and cleans the front surface of an image capturing surface by wiping the surface using a wind pressure or an adhesive sheet.

SUMMARY OF THE INVENTION

According to an aspect of the present invention, a cleaning apparatus that cleans a detection element including a detection surface, includes a first cleaner including a first cleaning portion configured to perform cleaning, and configured to clean the detection surface by using the first cleaning portion, a second cleaner including a second cleaning portion of a type different from the first cleaning portion, and configured to clean the detection surface by using the second cleaning portion, a driver to which the first cleaner and the second cleaner are attached and configured to move to approach or recede from the detection surface in a state where the first cleaner and the second cleaner are attached to the driver, and a control unit configured to control each of the first cleaner, the second cleaner, and the driver, wherein the control unit receives a setting for a combination of cleaning performed by the first cleaner and cleaning performed by the second cleaner, and controls, based on the received setting, a cleaning order and/or a number of cleaning operations of the cleaning performed by the first cleaner and the cleaning performed by the second cleaner.

Further features of the present invention will become apparent from the following description of exemplary embodiments with reference to the attached drawings.

BRIEF DESCRIPTION OF THE DRAWINGS

FIGS. 4A, 4B, and 4C are flowcharts each illustrating a sequence of the cleaning apparatus according to the exemplary embodiment.

FIGS. 6A, 6B, 6C, 6D, and 6E are diagrams each illustrating a display screen in the series of cleaning sequences according to the present exemplary embodiment.

DESCRIPTION OF THE EMBODIMENTS

Figure 1A:
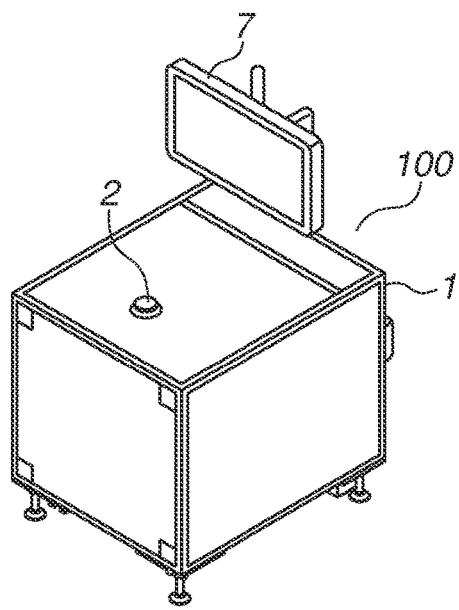
FIGS. 1A, 1B, and 1C are diagrams illustrating an external view, a perspective view of internal configuration, and a rear side internal configuration of a cleaning apparatus according to an exemplary embodiment of the present invention.

Exemplary embodiments of the present invention will be described in detail below with reference to the accompanying drawings. Throughout the drawings, the same or similar parts are denoted by the same reference numerals.

Japanese Patent No. 04537105 described above fails to fully describe how to configure or control a cleaning apparatus to remove various types of foreign parties adhering to a detection surface. The issue that foreign particles adhering to the detection surface need to be removed is a common issue not only for an image sensor, but also for general detection elements including a detection surface for detecting a physical quantity, and thus there is a demand for a cleaning apparatus. Accordingly, the present invention is directed to providing a cleaning apparatus capable of removing various types of foreign particles adhering to a detection surface of a detection element having the detection surface, and a control method for the cleaning apparatus.

Figure 1B:
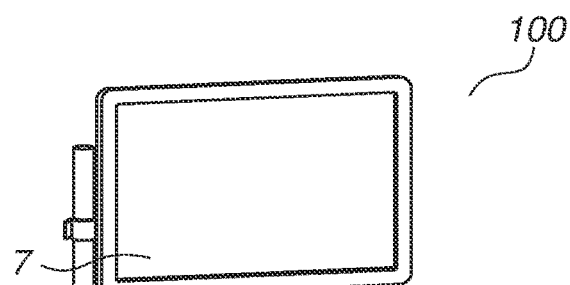
Figure 1C:
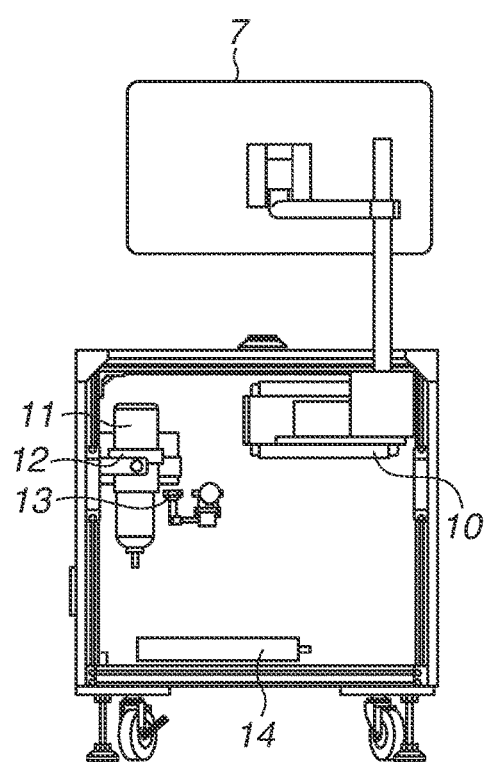

FIGS. 1A to 1C each illustrate a cleaning apparatus 100 as an example of a cleaning apparatus according to an exemplary embodiment of the present invention. In the present exemplary embodiment, a cleaning apparatus for cleaning an image capturing surface of an image sensor included in a digital camera and composed of a complementary metal-oxide semiconductor (CMOS) sensor, is employed as an example.

FIG. 1A illustrates an external view of the cleaning apparatus 100. The cleaning apparatus 100 includes a main body 1, which is formed of a metal chassis, a fixing unit 2 that fixes a detection apparatus (camera in the present exemplary embodiment) to be cleaned, and a display unit 7 that displays various types of information. The display unit 7 may be configured as a separate body that can communicate with the cleaning apparatus 100.

FIG. 1B illustrates an internal configuration of the cleaning apparatus 100. A movable pedestal 6 is integrally provided with a check unit 3, a first cleaning unit 4, and a second cleaning unit 5. The movable pedestal 6 is translated and rotated in a three-dimensional direction, thereby making it possible to change the position of each unit, as needed. In particular, the movable pedestal 6 includes a translation mechanism that can be translated in a vertical direction so that each unit can approach the position of the fixing unit 2, i.e., to an image sensor surface after a camera 200 is attached and can retract toward the cleaning apparatus 100.

The fixing unit 2 is composed of a ring-shaped metal member disposed on an exterior surface of the main body 1. In the present exemplary embodiment, the camera 200 to be cleaned has a structure in which a camera mount that enables an interchangeable lens to be attached to and detached from during normal use can be attached and fixed. The fixing unit 2 also includes an electrical connection terminal with which the fixing unit 2 can communicate with the attached camera 200. Further, the fixing unit 2 includes a ring-shaped illumination lamp used for ensuring an amount of light necessary during monitoring a state of cleaning performed by the cleaning apparatus 100, and irradiates the detection element to be cleaned (image sensor of the camera 200) with light during cleaning the detection element by the first cleaning unit 4 and the second cleaning unit 5. In particular, an appropriate shape (mechanism) of a connection part of the fixing unit 2 varies depending on the type of an external apparatus to be attached. Accordingly, the fixing unit 2 may be configured to be attachable to and detachable from the main body 1, and the fixing unit 2 may be replaced depending on an external apparatus that is assumed to be connected. Alternatively, a number of fixing units 2 corresponding to the number of types of external apparatuses that are assumed to be connected may be provided. More alternatively, the fixing unit 2 may be provided as a general-purpose fixing mechanism capable of fixing the camera 200, regardless of the apparatus type.

In the present exemplary embodiment, a connection terminal on the camera mount of the camera 200 to be attached is used to detect an attachment of the camera 200. More specifically, when the connection terminal of the fixing unit 2 is electrically connected to the connection terminal of the camera mount, the attachment of the camera 200 to the cleaning apparatus 100 is detected.

The first cleaning unit 4 is a cleaning unit for performing non-contact cleaning on the surface of the detection element. In the present exemplary embodiment, air is blown to blow off foreign particles by wind pressure.

The second cleaning unit 5 is a cleaning unit for performing contact cleaning on the surface of the detection element. In the present exemplary embodiment, foreign particles are cleaned off in a wipe cleaning operation using a wiping tool.

FIG. 1C illustrates a rear side internal configuration of the cleaning apparatus 100. Normally, a cover is attached to an external case so as to cover each unit attached to an internal case. A control unit 10 is composed of a computer including a central processing unit (CPU). The control unit 10 controls the overall operation of the cleaning apparatus 100. The control unit 10 processes information received from each unit, and instructs each unit to execute processing.

An air filter 11 is a filter that reduces foreign particles or oil present in the air when the air used for the first cleaning unit 4 is injected from an external pump or the like through an intake port 12. The air that has passed through the air filter 11 is supplied to the first cleaning unit 4. If the air filter 11 is omitted, there is a possibility that foreign particles included in the air may be blown toward the detection surface of the detection element. A pressure gauge 13 measures and displays the pressure of the air to be injected. A user can adjust the pressure of the air to an appropriate pressure, as needed, based on the pressure indicated by the pressure gauge 13.

A power supply source 14 supplies power to the entire cleaning apparatus 100. The power supply source 14 may also have a function of feeding power to an external apparatus via an interface (e.g., electrical connection terminal of the fixing unit, communication unit 17, in the present exemplary embodiment).

Figure 2:
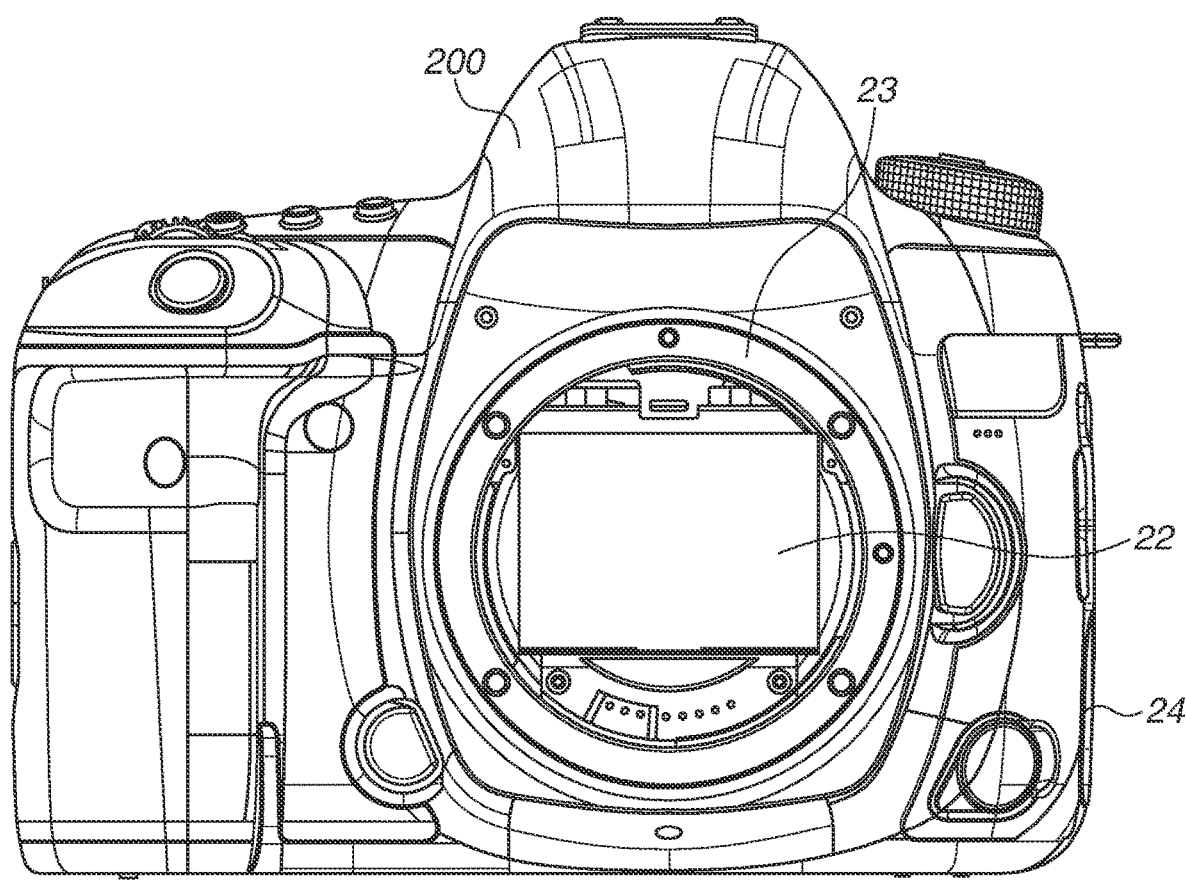
FIG. 2 is a diagram illustrating a front view of an image capturing apparatus according to the exemplary embodiment.

FIG. 2 illustrates the camera 200 as an example of an apparatus including the image sensor as the detection element to be cleaned. In the present exemplary embodiment, the camera 200 is a digital single-lens reflex camera of lens interchangeable type. A camera communication unit 24 includes, inside a cover, a connection terminal that complies with communication standards. The camera communication unit 24 performs communication in a state where the camera communication unit 24 is electrically connected to the cleaning apparatus 100 when the camera communication unit 24 is connected to the communication unit of the cleaning apparatus 100 with a cable such as a universal serial bus (USB). If the external apparatus is a lens, a camera control unit (not illustrated) controls the lens and exchanges various types of information about the lens and the camera 200. An image sensor 22 receives object light and converts the received object light into an electrical signal to thereby generate digital image data. In addition to a CMOS sensor used in the present exemplary embodiment, various types of sensors such as a charge-coupled device (CCD) type sensor and a charge injection device (CID) type sensor can also be used. Further, not only a light-receiving element, but also detection elements having any configuration can be used as a cleaning target of the cleaning apparatus 100, as long as the detection element includes a function for performing detection on a surface of an element, such as a detection element that detects an electromagnetic wave such as an X-ray. The image sensor 22 has a structure in which a cover glass, an infrared (IR) cut filter, and a low-pass filter (LPF) are stacked on a photodiode in a thickness direction. The cleaning apparatus 100 cleans the uppermost surface of the image sensor 22.

Next, a configuration for connecting the cleaning apparatus 100 according to the present exemplary embodiment with the camera 200 serving as the detection apparatus according to the present exemplary embodiment will be described with reference to FIG. 1B and FIG. 2.

A camera fixing unit 23 is connected to the fixing unit 2 of the cleaning apparatus 100, to thereby fix the camera 200. The control unit 10 can control the camera 200 by communicating with a camera control unit 21 via the communication unit 17 to be described below and the camera communication unit 24. For example, the cleaning apparatus 100 can perform control for determination of the camera type, an image capturing operation to cause a mirror and a shutter provided on the camera 200 to move, and other operations.

Referring to FIG. 1B, the second cleaning unit 5 is directed toward the fixing unit 2. The movable pedestal 6 includes the translation mechanism that can be translated in the vertical direction, which enables the second cleaning unit 5 to pass through the center of the ring of the fixing unit 2 and approach the image sensor 22 in a state where the camera 200 is physically connected.

The movable pedestal 6 also includes a rotation mechanism that rotates an attached member. The check unit 3, the first cleaning unit 4, and the second cleaning unit 5 are arranged at positions with different phases about a rotation axis of the rotation mechanism. This rotation mechanism can drive to rotate the front surface of each of the check unit 3 and the first cleaning unit 4 to a position opposed to the fixing unit 2 (i.e., the image sensor surface of the image sensor 22), like the second cleaning unit 5. Accordingly, when one of the check unit 3 and the first cleaning unit 4 is driven to rotate to the position opposed to the image sensor 22, the translation mechanism can cause the one of the check unit 3 and the first cleaning unit 4 to approach to an image sensor surface 30, which is a detection surface, relative to the other one of the check unit 3 and the first cleaning unit 4, and after cleaning, the translation mechanism can cause the one of the check unit 3 and the first cleaning unit 4 to retract toward the cleaning apparatus 100.

The rotation mechanism of the movable pedestal 6 is also used to control an inclination (controlling an angle) of the cleaning unit of each unit with respect to the detection surface in a cleaning sequence for each unit to be described below. More specifically, under the control of the control unit 10, the inclination of an injection port is controlled when the first cleaning unit 4 blows air toward the detection surface of the image sensor 22, and the inclination of the wiping tool (and a core) is controlled when the second cleaning unit 5 performs the wipe cleaning operation on the detection surface. As described above, using the translation mechanism and the rotation mechanism of the movable pedestal 6, the control unit 10 can control a distance from the detection surface, for example, by causing each unit to face, approach, and retract from the fixing unit 2, i.e., the detection surface of the detection element.

The check unit 3 includes an illumination lamp and irradiates an object with illumination light in response to an instruction from the control unit 10. In the present exemplary embodiment, a light-emitting diode (LED) is mounted on a leading end of the member, and the image sensor 22 is irradiated with the light in an approached state. In this case, an image of the element surface (sensor surface) of the image sensor 22 is captured, and the captured image is used to acquire an image used to check the state of dirt on the surface. In the following exemplary embodiments, an image of the sensor surface is acquired using an image capturing function of the image sensor 22. However, the present invention is not limited to this example. The check unit 3 itself may acquire information based on which the state of the surface of the detection element including any sensor, such as an image sensor, can be checked. In the present exemplary embodiment, the check unit 3 is attached to the movable pedestal 6 together with the first cleaning unit 4 and the second cleaning unit 5. However, for example, the check unit 3 may be fixed to a position near the fixing unit 2 and may be installed at the position. When the check unit 3 is installed in this manner, the irradiation and image capturing can be performed also during execution of cleaning by each cleaning unit. Further, an illumination lamp and/or an image sensor may be provided as the check unit 3 in the vicinity of a cleaning member, such as an injection port, a wiping tool provided at a leading end of the core, of each of the first cleaning unit 4 and the second cleaning unit 5.

The first cleaning unit 4 is a cleaning unit that performs non-contact cleaning on the detection element surface. In the present exemplary embodiment, air is blown from a leading end (injection port) of a cylindrical member, thereby blowing off foreign particles adhering to the surface of the approached image sensor 22 by wind pressure. Further, in the present exemplary embodiment, the first cleaning unit 4 includes an ionizer having a neutralization function that is obtained by electrically charging the air so that foreign particles adhering to the surface of the image sensor 22 can be neutralized and easily removed. However, the ionizer need not necessarily be provided because a certain level of effect can be obtained only by blowing air without providing the neutralization function.

The second cleaning unit 5 is a cleaning unit that performs contact cleaning on the detection element surface. In the present exemplary embodiment, foreign particles are cleaned off by directly wiping the surface of the approached image sensor 22 in the wipe cleaning operation using a wiping tool mainly attached to a leading end of the core. Examples of the wiping tool to be used include a microfiber cloth, paper, and tape. The second cleaning unit 5 is configured in such a manner that the second cleaning unit 5 comes into contact and moves to perform the wipe cleaning operation in a retractable manner and a new wiping tool contacts the cleaning surface. Further, in the present exemplary embodiment, the second cleaning unit 5 is also configured to perform cleaning by immersing the wiping tool in a solvent to remove grease, as needed. The specific configurations of the first cleaning unit 4 and the second cleaning unit 5 are not particularly limited, as long as the first cleaning unit 4 and the second cleaning unit 5 are a non-contact cleaning unit and a contact cleaning unit, respectively.

Figure 3:
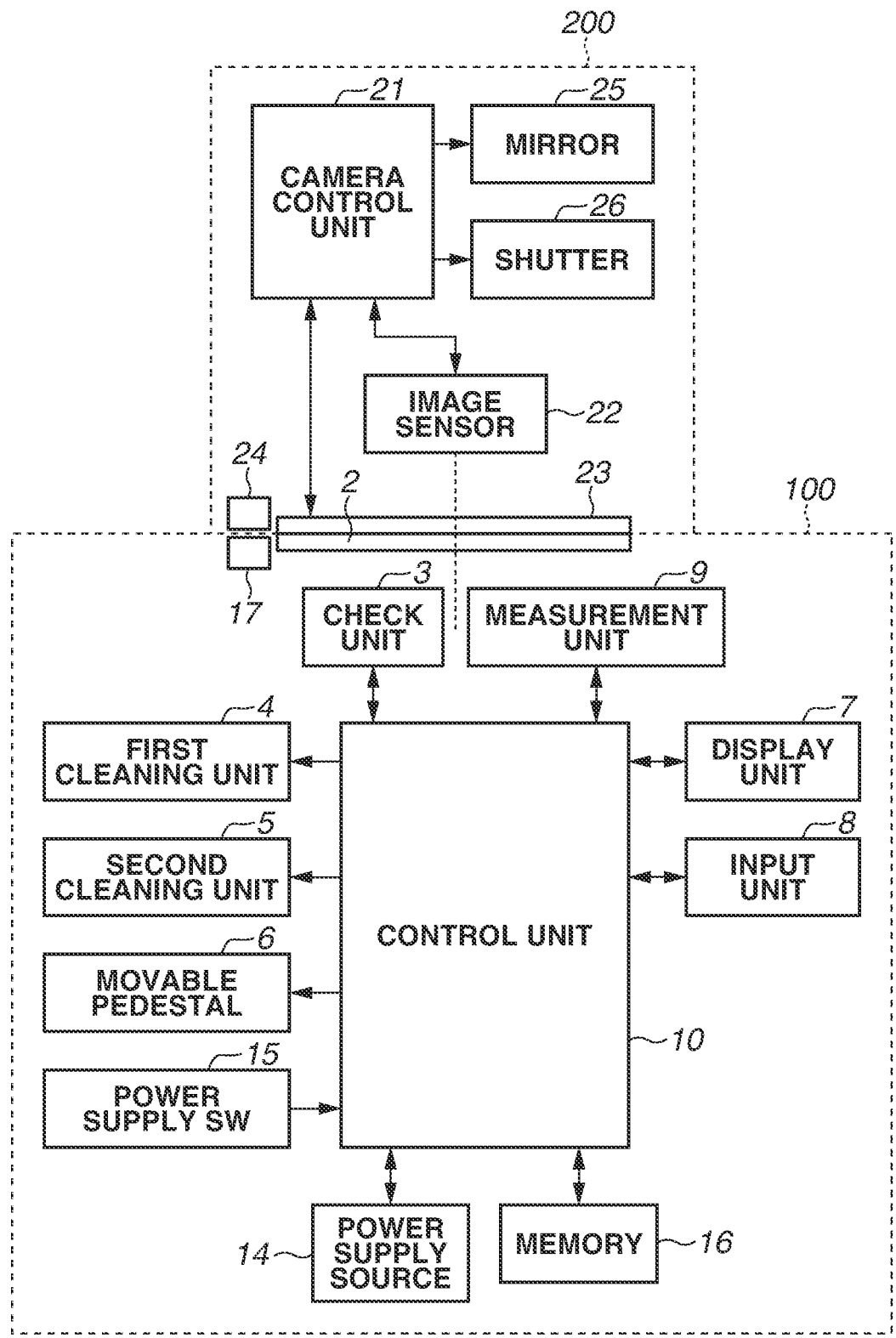
FIG. 3 is a block diagram illustrating a configuration of a main part of each of the cleaning apparatus and the image capturing apparatus according to the exemplary embodiment.

FIG. 3 is a block diagram illustrating a main electrical configuration of each of the cleaning apparatus 100 and the camera 200 according to the present exemplary embodiment.

The cleaning apparatus 100 operates with power supplied from the power supply source 14, and ON/OFF of the power supply source 14 is switched by a power supply SW 15. The display unit 7 displays various types of information about the cleaning apparatus 100 and the camera 200, and various types of information, such as an operation state, a setting made by a user operation, and a guidance for user operation, in response to an instruction from the control unit 10.

An input unit 8 receives information about an external apparatus stored in a memory 16 or acquired through the communication unit 17 or another communication path, so that an appropriate operation can be performed depending on the camera 200 to be attached. The input unit 8 also receives information about various types of instructions by user operations. In the present exemplary embodiment, as the information about the external apparatus, model information and specifications of the camera 200 to be connected are acquired through the input unit 8.

A measurement unit 9 is composed of, for example, a laser distance meter, and measures the position (e.g., coordinates, a distance from the image sensor) and size of the image sensor 22 of the camera 200 to be connected. If the model information about the camera 200 to be attached is determined and the corresponding cleaning program is stored in the memory 16, there is no need to provide the measurement unit 9 to measure the position and size of the image sensor 22. The control unit 10, which is composed of a computer including a CPU incorporated in the main body 1 of the cleaning apparatus 100, controls the overall operation of the cleaning apparatus 100. The control unit 10 processes information from each unit, and instructs each unit to execute processing.

The connection terminal provided on the fixing unit 2 detects an electrical connection to connection terminals (lower part eight connection terminals in FIG. 2) of the camera fixing unit 23 when the camera fixing unit 23 is attached to the fixing unit 2, and the control unit 10 detects the connection of the camera 200.

The communication unit 17 communicates with the detection apparatus including the detection element. In the present exemplary embodiment, the communication unit 17 is a connection terminal that complies with USB standards, and is electrically connected to the camera communication unit 24 of the camera 200 through a connection cable. When the connection cable is connected to each terminal of the communication unit 17 and the camera communication unit 24 in a state where both the power supplies of the cleaning apparatus 100 and the camera 200 are ON, the cleaning apparatus 100 and the camera 200 are energized and communication is established between the cleaning apparatus 100 and the camera 200. The method for communication between the cleaning apparatus 100 and the camera 200 is not limited to this example. Known communication methods, such as a wired local area network (LAN), a high-definition multimedia interface (HDMI®), and a wireless LAN (Wi-Fi®, Bluetooth®, Bluetooth® Low Energy) can also be used.

Next, a configuration example of the camera 200 to be detachably connected to the cleaning apparatus 100 will be described. The camera control unit 21 is a microcomputer, and controls the overall operation of the entire camera 200, such as operation control of the image sensor 22, storage of captured images, and data communication.

The image sensor 22 is disposed at a position that is accessible through an opening formed in the camera mount, and includes a detection surface composed of a photodiode that receives a light beam from an object normally in a state where an image capturing lens is attached. The light beam received by the image sensor 22 is converted into an electrical signal and the electrical signal is output as image data.

A mirror 25 is located on an optical axis at a location closer to the object than the image sensor 22 in the camera 200, and reflects or divides light to be transmitted to the image sensor 22 onto a sensor (not illustrated) other than the image sensor 22, an optical viewfinder, or the like. It is necessary to cause the mirror 25 to retract to a certain extent from the optical axis of the image sensor 22 during cleaning of the image sensor 22. In the present exemplary embodiment, it is assumed that the camera 200 uses a mechanism for causing the mirror 25 to retract from the optical axis during exposure of the image sensor 22 to cause the mirror 25 to retract from the optical axis to such an extent that a member from the cleaning apparatus 100 can approach the image sensor 22 during cleaning. In the present exemplary embodiment, the camera 200 serving as the detection apparatus is a digital single-lens reflex camera including the mirror 25. However, the present invention can be applied to a mirrorless single-lens camera, which includes no optical finder and no mirror.

A light-shielding member (also referred to shutter) 26 is located at a location closer to the object than the image sensor 22 in the camera 200, and serves as a shutter that blocks light from being transmitted to the image sensor 22 during image capturing.

Next, various operation sequences of the cleaning apparatus 100 will be described with reference to FIGS. 4A to 4F.

FIG. 4A is a flowchart illustrating a check sequence for checking a state (dirt state, cleaning state) of the detection element surface to be cleaned by using the check unit 3. In the entire cleaning sequence to be performed by the cleaning apparatus 100, the control unit 10 performs each operation in the processing flow or instructs each unit to execute each operation, as needed. In the cleaning apparatus 100, when the check sequence is started, the camera 200 is already fixed to the cleaning apparatus 100 by the camera fixing unit 23 and the fixing unit 2, and the communication unit 17 establishes communication with the camera communication unit 24 to communicate with the camera 200 through a USB connection cable.

In step S100, the control unit 10 controls the movable pedestal 6 to direct the check unit 3 toward the fixing unit 2, and then causes the check unit 3 to move so as to pass through the fixing unit 2 and the camera fixing unit 23 and causes a leading end of the check unit 3 to approach the image sensor 22. In step S101, in the vicinity of the image sensor 22, the check unit 3 irradiates the image sensor 22 with light by light emission of a point light source, such as an LED, which is provided at the leading end of the check unit 3. The configuration of the illumination is not limited to a point light source, but instead any configuration can be applied. If the point light source is used, it is more desirable that uniform light is incident on each element and the state of the detection surface can be measured under substantially the same conditions. Therefore, the point light source is preferably used.

In a state where the above-described illumination is irradiated, the control unit 10 sends a signal to the camera control unit 21 through the communication unit 17 and the camera communication unit 24. In step S102, the control unit 10 causes the image sensor 22 to perform the image capturing operation. In step S103, the control unit 10 acquires the captured image. In step S104, the acquired image is recorded on the memory 16 through the communication unit 17 and is converted into an image for display and displayed on the display unit 7. In this case, the control unit 10 detects, from the image that is captured and recorded, the state of the image sensor surface and information about foreign particles or dirt by a known image analysis method such as singularity detection for detecting a point at which the difference between a signal level of a target area and a signal level of a peripheral area is greater than a limit value, and displays the detected state and information, as well as the image, on the display unit 7. In the present exemplary embodiment, based on these pieces of information, checking of an initial state of the image capturing surface, cleaning completion determination after cleaning, comparison and presentation before and after cleaning, and the like are performed. According to the present exemplary embodiment, in the cleaning sequence after any cleaning operation, the comparison and presentation before and after cleaning are performed on the display unit 7 as the checking result, thereby making it possible to notify the user of the cleaning effect and information about remaining foreign particles.

After image recording, in step S105, the check unit 3 retracts toward the cleaning apparatus 100 from a location near the image sensor 22, and then the check sequence ends.

Figure 4D:
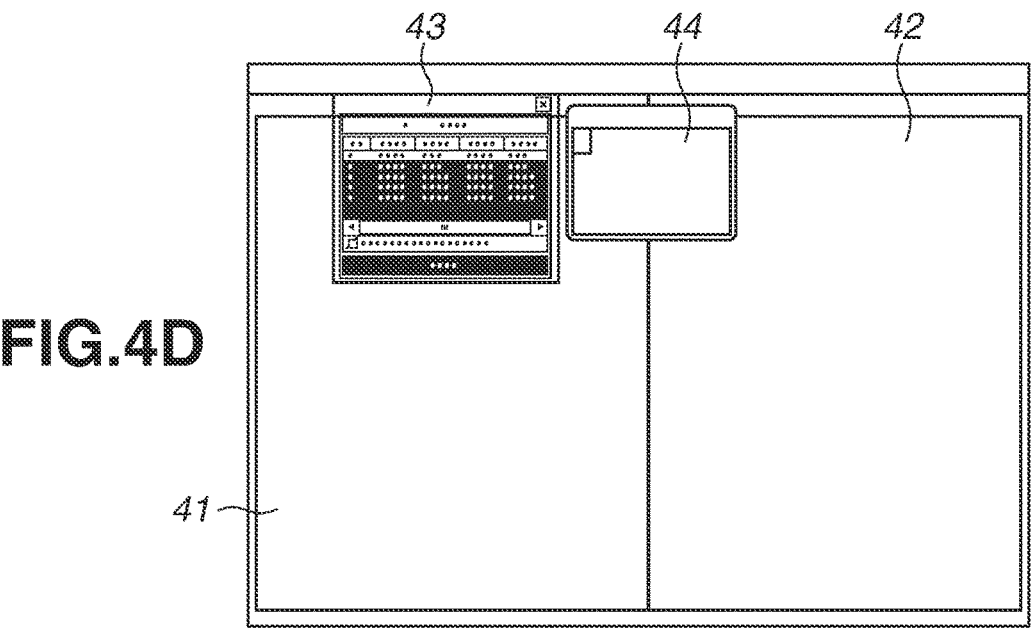
FIGS. 4D, 4E, and 4F are diagrams each illustrating an example of a screen to be displayed on a display unit according to the exemplary embodiment.

FIG. 4D illustrates an example of a screen to be displayed on the display unit 7 in step S104 in the check sequence after cleaning. A check image window 41 displays a part of a check image captured by the image sensor 22 in a state where the illumination by the check unit 3 is radiated. A foreign particle detection image window 42 displays a foreign particle image that corresponds to the check image displayed on the check image window 41 and is processed so as to easily detect and visually observe foreign particles by, for example, increasing the gain of the check image. A foreign particle information window 43 displays information about the detection result obtained after foreign particles are detected by the image analysis as described above. In the present exemplary embodiment, the number of foreign particles (five in FIG. 4D) and each foreign particle detection range (i.e., each area in which foreign particles are detected with a maximum value and a minimum value of X, Y coordinates of the detection surface of the detection element) are displayed. However, only one of the number of foreign particles and each foreign particle detection range may be displayed. In other words, at least one of positional information about the area in which foreign particles are detected and the number of remaining foreign particles is informed. An overall image window 44 displays a preview of the entire check image and the position of the check image currently displayed on the check image window 41 in a distinguishable manner. These windows allows the user to easily recognize the number, size, and position of foreign particles remaining on the image sensor 22 after cleaning. Further, the check image obtained before cleaning and the foreign particle detection image are compared with information indicating the result of detecting foreign particles, thereby making it possible to check how cleaning is effective in removing foreign particles. In this case, the check image, the foreign particle detection image, and information about the result of detecting foreign particles, obtained through each check sequence, are temporarily recorded on the memory 16, but instead a part or the whole of the images and information may be read out and transmitted to the camera 200 and then recorded on a memory or a recording medium in the camera 200. Further, the control unit 10 may be connected to a server, and these pieces of information may be, for example, displayed, printed, or recorded by another apparatus via the server.

FIG. 4B is a flowchart illustrating a first cleaning sequence for cleaning the surface of the detection surface by a non-contact cleaning method using the first cleaning unit 4. In the entire cleaning sequence performed by the cleaning apparatus 100, the control unit 10 performs each operation in the processing flow, as needed, or instructs each unit to execute each operation. When the first cleaning sequence is started, the camera 200 is already fixed by the camera fixing unit 23 and the fixing unit 2 to the cleaning apparatus 100, and the communication unit 17 establishes communication with the camera communication unit 24 to communicate with the camera 200 through a USB connection cable.

First, in step S110, the control unit 10 controls the movable pedestal 6 to direct the first cleaning unit 4 toward the fixing unit 2 and further move to pass through the fixing unit 2 and the camera fixing unit 23, and then causes a portion (leading end) of the first cleaning unit 4 that is used for cleaning to approach the image sensor 22. After that, in step S111, the first cleaning unit 4 blows air from an injection port formed at the leading end thereof in the vicinity of the image sensor 22.

In this manner, the first cleaning unit 4 can remove, from the surface, foreign particles, such as solid foreign particles (relatively large particles) or dusts, which adhere to the image sensor surface 30 of the image sensor 22, by the blown air. In this case, for example, if cleaning is performed along the image sensor surface 30 in the same manner as that the second cleaning unit 5 performs cleaning in a state where large solid foreign particles adhere to the image sensor surface 30, the foreign particles carried during cleaning may damage the surface. On the other hand, in the method of removing foreign particles in a non-contact manner, like by the first cleaning unit 4, foreign particles are not carried on the image sensor surface 30, which is advantageous in preventing damage to the surface.

In addition, according to the present exemplary embodiment, the control unit 10 controls the movable pedestal 6 so as to prevent the first cleaning unit 4 from contacting the image sensor surface 30 of the image sensor 22 through the first cleaning sequence. This can further reduce possibility of damaging the image sensor surface 30 of the image sensor 22. After air is blown, in step S112, the first cleaning unit 4 retracts from a location near the image sensor 22, and then the first cleaning sequence is terminated.

Figure 4E:
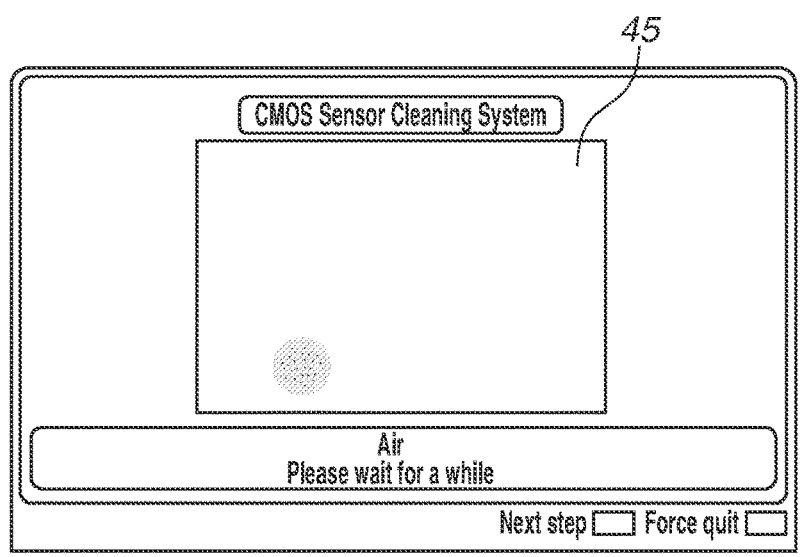

FIG. 4E illustrates an example of a monitoring screen to be sequentially displayed on the display unit during cleaning in step S111 in the first cleaning sequence. A first monitoring screen 45 sequentially displays images obtained by successively capturing images of the state of cleaning performed by the first cleaning unit 4 in a state where an annular LED, which is attached to the fixing unit 2, is caused to emit light to irradiate the image sensor 22 with light. The air injection port of the first cleaning unit 4 is displayed as a shadow, and thus the location where the first cleaning unit 4 is currently cleaning can be checked. Further, information indicating that the first cleaning sequence is currently performed is displayed ("Air" in FIG. 4E) on the display screen. In this case, a point light source may be used as the illumination lamp attached to the fixing unit 2. A depth of field of an image obtained in this case increases, so that a clearer monitoring video image can be obtained. In addition, a remaining time until the end of the first cleaning sequence may also be displayed on the display screen.

FIG. 4C is a flowchart illustrating a second cleaning sequence for performing contact cleaning on the surface of the detection element by using the second cleaning unit 5. In the entire cleaning sequence performed by the cleaning apparatus 100, the control unit 10 performs each operation in the processing flow on each unit, or instructs each unit to execute each operation, as needed. When the second cleaning sequence is started, the camera 200 is already fixed to the cleaning apparatus 100 by the camera fixing unit 23 and the fixing unit 2, and the communication unit 17 establishes communication with the camera communication unit 24 to communicate with the camera 200 through a USB connection cable.

First, in step S120, the control unit 10 controls the movable pedestal 6 to direct the second cleaning unit 5 toward the fixing unit 2 and further move so as to pass through the fixing unit 2 and the camera fixing unit 23, and then causes a portion (leading end) of the second cleaning unit 5 that is used for cleaning to approach the image sensor 22. In this case, if a solvent is used to remove grease or the like during the wipe cleaning operation, the movable pedestal 6 is controlled to dip the leading end of the second cleaning unit 5 in the solvent contained in a container that is provided at another rotation position, and then the second cleaning unit 5 is directed toward the fixing unit 2. Then, in step S121, the second cleaning unit 5 brings the leading end thereof into contact with the image sensor 22 in the vicinity of the image sensor 22, and then wipes the surface of the image sensor 22 with a wiping tool (cloth, paper, or the like) attached to the leading end thereof. By the above-described procedure, the second cleaning unit 5 can remove, from the surface of the image sensor 22, dirt such as foreign particles or highly adhesive oil adhering to the surface of the image sensor 22. After cleaning, in step S122, the second cleaning unit 5 retracts from a location near the image sensor 22, and then the second cleaning sequence is terminated.

Figure 4F:
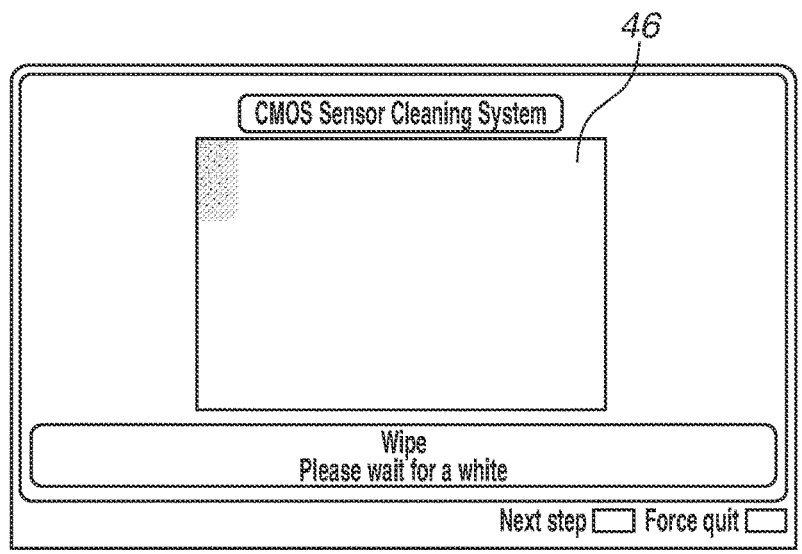

FIG. 4F illustrates an example of a monitoring screen displayed on the display unit 7 during cleaning in step S121 in the second cleaning sequence. A second monitoring screen 46 displays images obtained by successively capturing images of the state of cleaning performed by the second cleaning unit 5 in a state where an annular LED, which is attached to the fixing unit 2, is caused to emit light to irradiate the image sensor 22 with light. The wiping tool of the second cleaning unit 5 is displayed as a shadow, and thus the location where the second cleaning unit 5 is currently cleaning can be checked. Further, information indicating that the second cleaning sequence is currently performed ("Wipe" in FIG. 4F) is displayed on the display screen. In addition, a remaining time until the end of the second cleaning sequence may also be displayed on the display screen.

Next, a processing flow of the entire cleaning sequence according to the present exemplary embodiment will be described with reference to a flowchart illustrated in FIG. 5. This processing flow is started, for example, when the power supply source 14 is turned on by operating the power supply SW 15, or when an instruction for stating a cleaning step is received from the input unit 8. The control unit 10 performs each operation in the processing flow, or instructs each unit to execute each operation.

Figure 5:
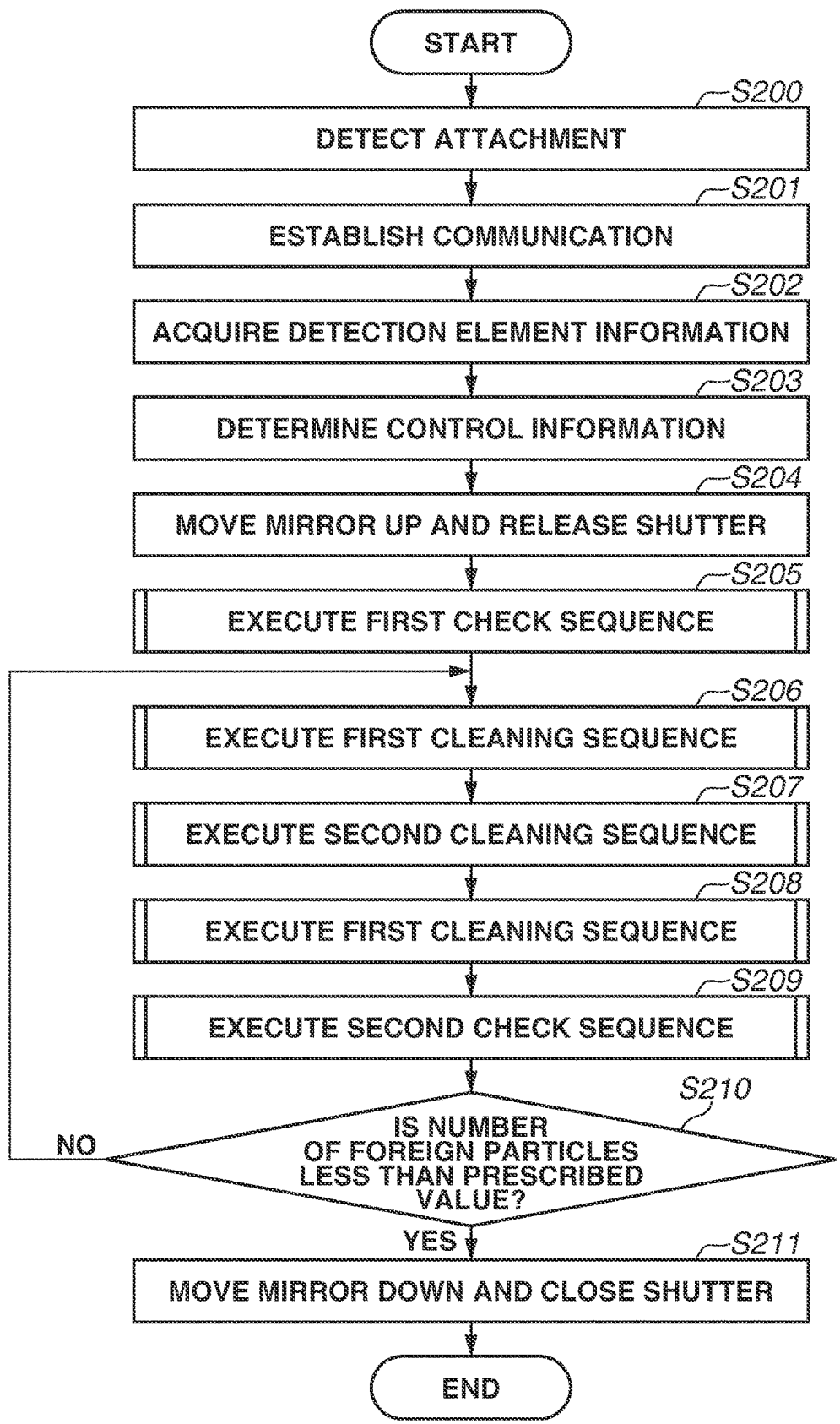
FIG. 5 is a flowchart illustrating a series of cleaning sequences according to the exemplary embodiment.
Figure 6A:
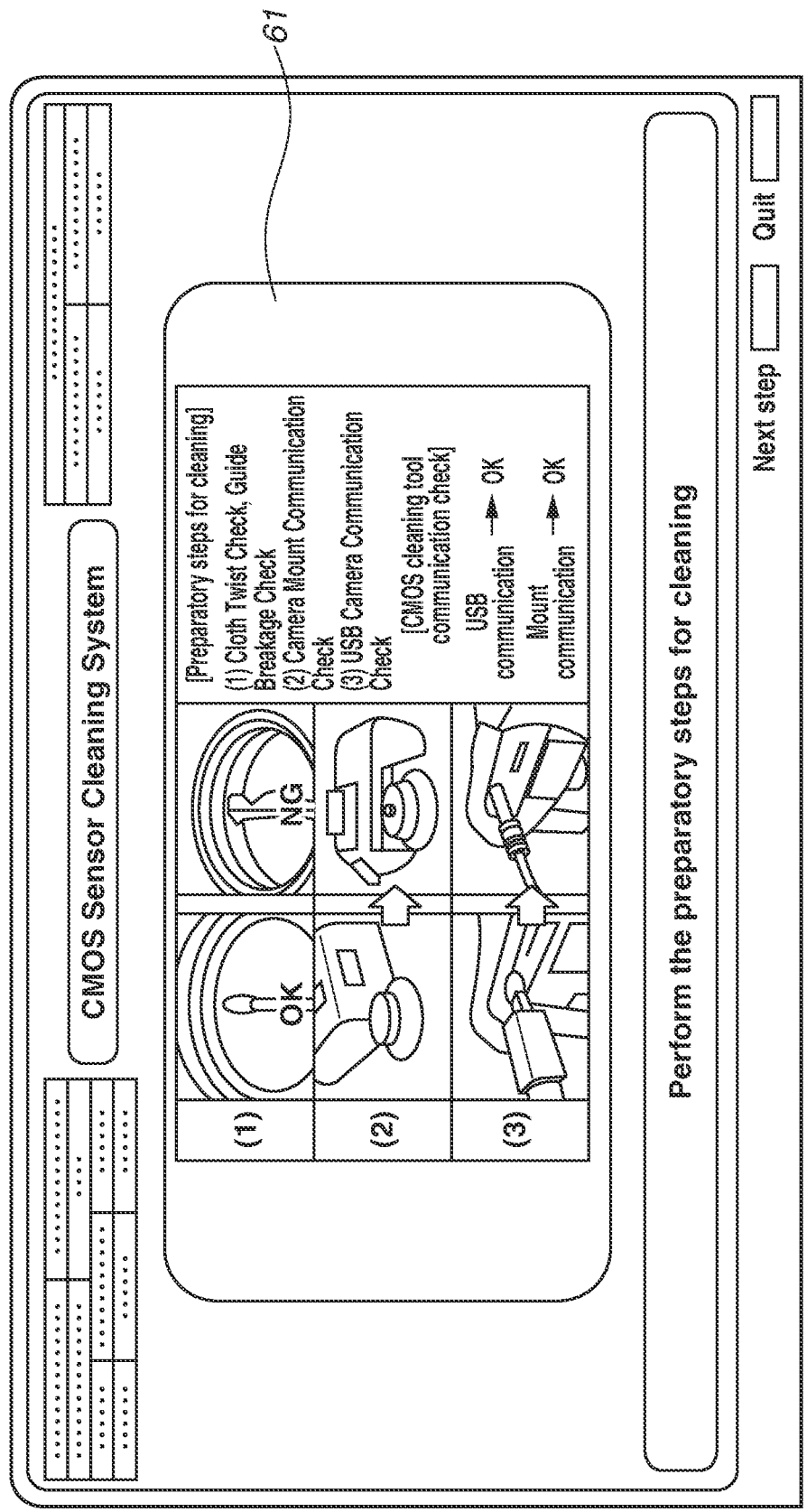

FIGS. 6A to 6E each illustrate an example of a display screen displayed on the display unit 7 during execution of each processing flow illustrated in FIG. 5, or before and after the execution of each processing flow illustrated in FIG. 5. FIG. 6A is a display screen for performing a guide display that is displayed by the control unit 10 on the display unit 7 before the processing flow is started and is used to guide an operation when the cleaning sequence is executed. An attachment guide display 61 performs the following three guide display operations:

(1) A guide display to prompt the user to check a distortion or the like of the wiping tool at the leading end of the second cleaning unit 5;
(2) A guide display to prompt the user to perform an attachment and fixation to the fixing unit 2 of the camera 200; and
(3) A guide display to prompt the user to connect a connector with one end connected in advance to the communication unit 17, to the camera communication unit 24.

When the camera fixing unit 23 is attached and fixed to the fixing unit 2, the control unit 10 detects the attachment based on the electric conduct of the connection terminal of the mount, and informs the user that the attachment is detected. In the present exemplary embodiment, the attachment is informed by the screen display, but instead may be informed by other means such as sound. The control unit 10 also detects that the communication unit 17 and the camera communication unit 24 are electrically connected and communication is established between the communication unit 17 and the camera communication unit 24, and informs the user of the detection result. These guide display operations enable the user to easily complete a preparation for the cleaning operation only by following the guide. The guide display operations are not limited to the operations described in the present exemplary embodiment, but instead only some of the three guide display operations described above may be carried out.

In step S200, the control unit 10 uses the connection terminal provided on the fixing unit 2 to detect that the camera fixing unit 23 of the camera 200 is attached and fixed to the fixing unit 2. Next, in step S201, the control unit 10 detects that the communication unit 17 and the camera communication unit 24 are electrically connected, and upon detecting the electrical connection, the control unit 10 establishes communication between the cleaning apparatus 100 and the camera 200.

Next, in step S202, the control unit 10 acquires detection element information about the detection element to be cleaned. Examples of the detection element information include information about the position, size, and material of the image sensor 22, and the position of a member that interferes with cleaning of the image sensor 22. These pieces of information may be acquired by the camera 200 through communication, or the detection element information may be read out from a database preliminarily stored in the memory 16 based on camera model information acquired from the camera 200. Alternatively, the detection element information or the model information about the camera 200 may be acquired by a user input through the input unit 8. In the exemplary embodiment in which the check unit 3 is provided with a sensor for detecting the state of the image sensor 22, in step 202, the detection element information is acquired based on, for example, information about an image detected by the check unit 3.

In step S203, the control unit 10 determines control information based on the detection element information about the image sensor 22 obtained in step S202. More specifically, based on the information about the position and size of the image sensor 22, a driving range when the check unit 3, the first cleaning unit 4, and the second cleaning unit 5 are caused to move forward or backward by using the movable pedestal 6 is determined, and the distance from the detection surface is controlled. Further, an air injection position or an injection strength of the first cleaning unit 4, a wipe cleaning range of the second cleaning unit 5, whether to use a solvent to be applied to the wiping tool, and the like are determined. In this case, according to the present exemplary embodiment, a plurality of cleaning courses using at least one of the first cleaning unit 4 and the second cleaning unit 5 is prepared, and the user can select a cleaning course from among, for example, a plurality of candidates displayed on the display unit 7 in consideration of a dirt state, an operation time, and the like. For example, the following cleaning courses are prepared. In the present exemplary embodiment, the subsequent processing flow will be described assuming that Course 1 is selected. However, if a course other than Course 1 is selected, steps unnecessary for the selected course may be omitted as needed (without performing any operation). Settable courses are not limited to these examples, but instead courses prepared by the user by arbitrarily setting various sequences may be provided. Specifically, the control unit 10 prepares a plurality of patterns of combinations in advance, or manually receives a setting for a combination of cleaning performed by the first cleaning unit 4 and cleaning performed by the second cleaning unit 5. Based on the received setting, a cleaning order and/or the number of cleaning operations performed by the first cleaning unit 4 and the cleaning performed by the second cleaning unit 5 is controlled to clean the detection surface.

Figure 6B:
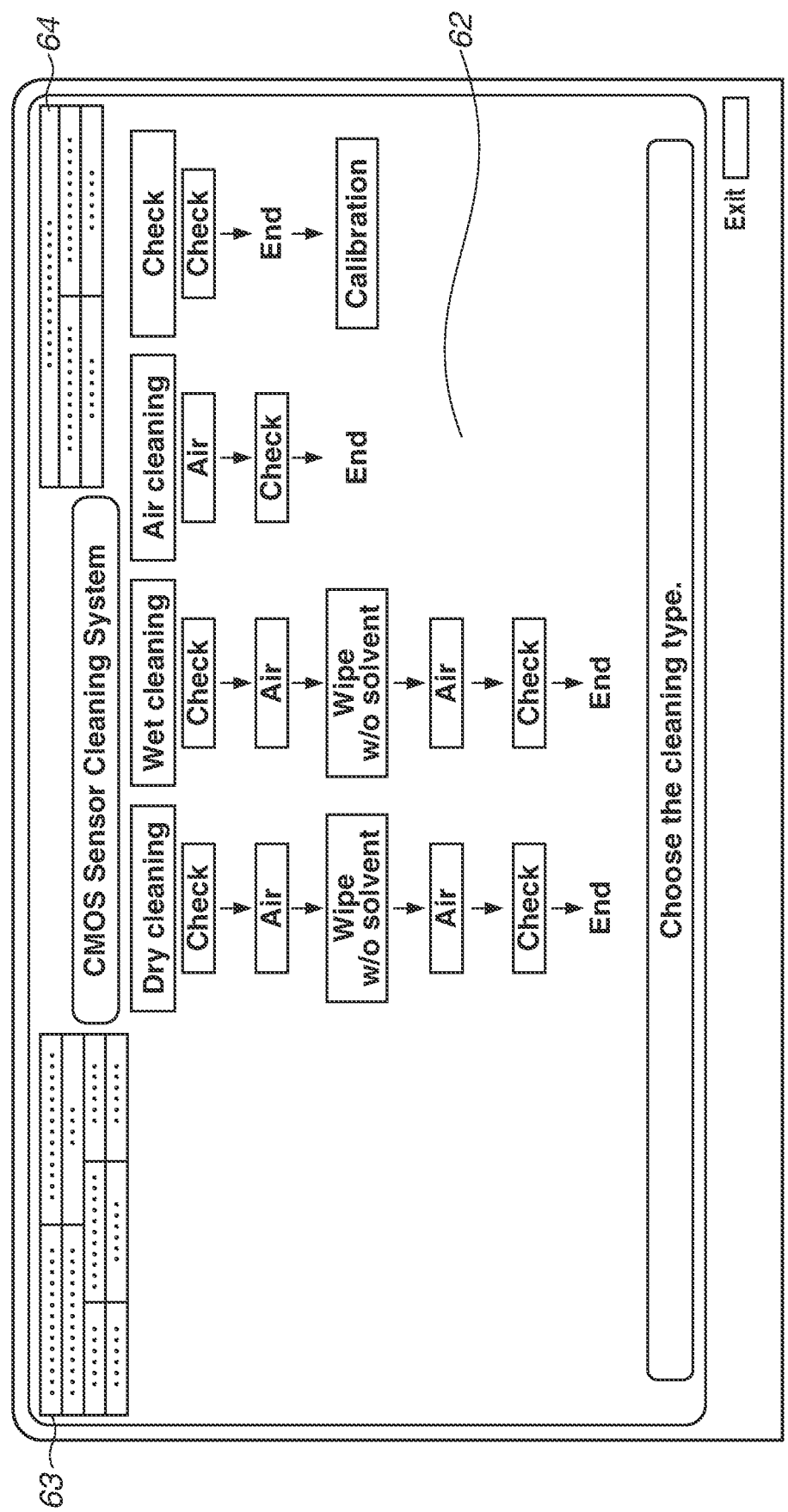

FIG. 6B illustrates a display example of a selection screen for selecting a combination (course) of cleaning sequences.

A course display 62 is a graphical user interface (GUI) with which examples of a combination of a plurality of patterns prepared in advance can be displayed in a comparable manner and selected. In the present exemplary embodiment, different courses are prepared depending on whether to use a solvent at a time of the wipe cleaning operation performed by the second cleaning unit 5. A calibration source for calibration of each cleaning unit is also provided. For example, other courses as described below, including courses other than those illustrated in the drawings, can be employed.

Course 1: First check sequence→First cleaning sequence→Second cleaning sequence→First cleaning sequence→Second check sequence
Course 2: First check sequence→First cleaning sequence→Second cleaning sequence→Second check sequence
Course 3: First check sequence→Second cleaning sequence→First cleaning sequence→Second check sequence
Course 4: First check sequence→First cleaning sequence→Second check sequence
Course 5: First check sequence→Second cleaning sequence→Second check sequence
Course 6: First check sequence.

An estimated time required to complete each course may be displayed on the course display 62.

As illustrated in FIG. 6C, a state display 63 is an area in which the control unit 10 displays cleaning apparatus information indicating a state of the cleaning apparatus 100. Examples of the cleaning apparatus information include the remaining length of the wiping tool of the second cleaning unit 5, the remaining number of cleaning operations, the temperature of the control unit 10, and the temperature in the vicinity of the cleaning area (near the detection surface). The display of these pieces of cleaning apparatus information enables the user to provide information to support the execution of cleaning, such as cleaning of each camera, for example, in consideration of the remaining number of cleaning operations.

As illustrated in FIG. 6D, a state display 64 is an area in which the control unit 10 displays the state of the camera 200. Examples of the detection element information about the detection apparatus include a previous number of cleaning operations, a date and time when cleaning is performed, and camera model information as information for specifying the detection element.

The display of these pieces of detection element information enables the user to, for example, check the model to be cleaned, or recognize the when and how many cleaning operations are performed in the past. Accordingly, it is possible to provide information to support the user to, for example, cancel cleaning if an erroneous camera is set as a cleaning target, or if a cleaning cycle is extremely short.

In step S204, to execute various sequences on the image sensor 22, the control unit 10 transmits a signal to instruct the camera control unit 21 to move the mirror 25 up and release a shutter 26. Upon receiving the instruction signal to move the mirror 25 up and releasing the shutter 26, the camera control unit 21 causes the mirror 25 to move up and causes the shutter 26 to be released, and then transmits a signal indicating that the operation is completed to the control unit 10. Upon receiving the signal, the processing which has received the signal proceeds to step S205. However, in some camera models, such as the mirrorless single-lens camera described above, the image sensor 22 is not shielded and cleaning can be performed without carrying out step S204. In this case, step 204 and step S211 that is described below can be omitted.

In step S205, the control unit 10 executes the check sequence illustrated in FIG. 4A as a first check sequence to be performed before cleaning. In step S206, the control unit 10 performs the first cleaning sequence using the first cleaning unit 4 as illustrated in FIG. 4B. After the first cleaning sequence is finished, in step S207, the control unit 10 performs a second cleaning sequence using the second cleaning unit 5 as illustrated in FIG. 4C. In this case, the first cleaning sequence is carried out before the second cleaning sequence. This is because large foreign particles needs to be removed in advance in the first cleaning sequence to prevent large foreign particles, adhering to the image sensor surface 30 and carried in the wipe cleaning operation performed by the second cleaning unit 5, from damaging the surface.

After the second cleaning sequence is finished, in step S208, the control unit 10 performs the first cleaning sequence using the first cleaning unit 4 again. The operation in the sequence may be the same as that in step S206, or may be different from that in step S206. In this case, the first cleaning sequence is carried out after the second cleaning sequence. This is because fibers of the wiping tool may remain on the image sensor surface 30 during the wipe cleaning operation performed by the second cleaning unit 5, or foreign particles pushed out of the image sensor surface 30 may remain in the vicinity of the image sensor surface 30. If the first cleaning sequence is carried out after the second cleaning sequence, these foreign particles can be blown off and cleaned.

After the first cleaning sequence in step S208 is finished, in step S209, the second check sequence after cleaning as illustrated in FIG. 4A is performed. The second check sequence differs from the first check sequence performed before cleaning in that images obtained before and after cleaning and the state such as the number of foreign particles can be displayed on the display unit 7 in a comparable manner in step S104. In step S210, it is determined whether the number of foreign particles is less than a prescribed value based on information after cleaning about the image acquired in step S209. If the number of foreign particles is not less than the prescribed value (NO in step S210), the processing returns to step S206 to perform cleaning again. In this case, to remove foreign particles remaining even after each cleaning sequence is performed once, each cleaning sequence may be performed again after changing various types of parameters for cleaning. For example, the first cleaning unit 4 may set the air injection strength to be higher than before, set the degree of charging by the ionizer to be higher than before, set the injection time to be longer than before, or set a movement range to be wider than before. Further, the second cleaning unit 5 may dip the wiping tool in a solvent if the wiping tool is not dipped in the solvent in the previous cleaning operation, or set a contact pressure on the image sensor surface 30 to be higher than before.

In step S210, if the number of foreign particles is less than the prescribed value (YES in step S210), the processing proceeds to step S211. In step S211, the control unit 10 transmits a signal to instruct the camera control unit 21 to move the mirror 25 down and close the shutter 26. In step S211, the camera control unit 21, which has received the instruction signal to move the mirror 25 down and close the shutter 26, causes the mirror 25 to move down and causes the shutter 26 to be closed, and then transmits a signal indicating that the operation is completed to the control unit 10. Then, the control unit 10, which has received the signal, terminates the cleaning sequence.

In this case, according to the present exemplary embodiment, in step S210, the number of foreign particles remaining on the image sensor 22 is detected to check the cleaning state. However, the present invention is not limited to this example. Other analysis results may be used as criteria, as long as the results indicate the state of the image sensor 22 that can be analyzed based on an image. In the present exemplary embodiment, an example in which each cleaning sequence is repeatedly performed until the number of foreign particles is less than the prescribed value, is described as an example. However, there is no need to provide, in particular, the processing flow to be repeatedly performed, as long as the cleaning results, such as the number of foreign particles, are displayed on the display unit 7.

Figure 6E:
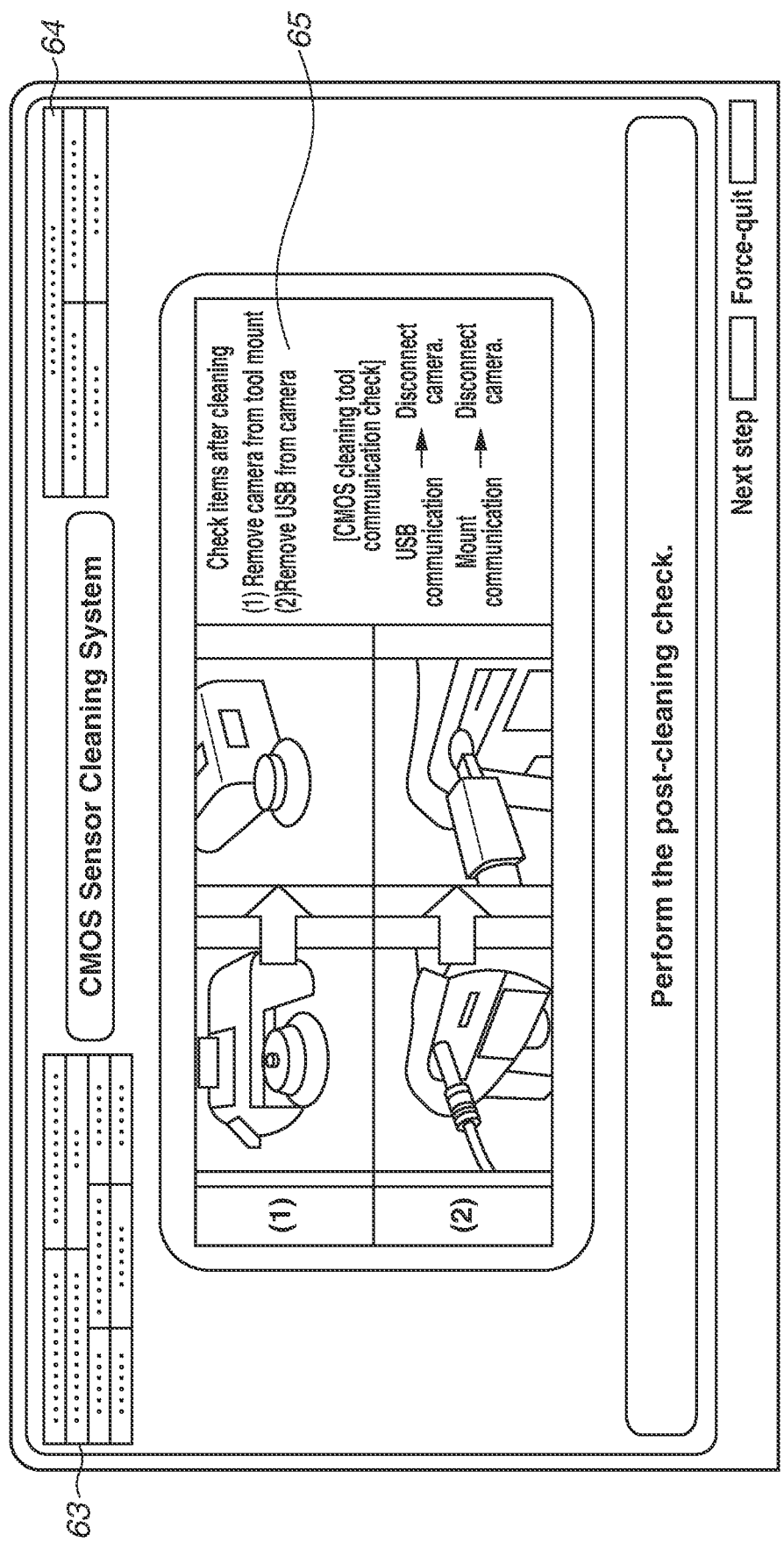

FIG. 6E illustrates a display screen displayed by the control unit 10 on the display unit 7 when the processing flow illustrated in FIG. 5 is finished, and used to perform a guide display to guide an operation to be performed when the use of the cleaning apparatus 100 is terminated. A detachment guide display 65 performs the following two guide display operations:

(1) A guide display to prompt the user to perform detachment from the fixing unit 2 of the camera 200; and (2) A guide display to prompt the user to detach a connector from the camera communication unit 24. When the camera fixing unit 23 is detached from the fixing unit 2, the electrical connection of the connection terminal of the mount is disconnected, so that the control unit 10 detects the detachment and informs the user that the detachment is detected. In the present exemplary embodiment, the attachment is informed by the screen display, but instead may be informed by other means such as sound. The control unit 10 also detects the disconnection of the electrical connection between the communication unit 17 and the camera communication unit 24, and informs the user of the detection result. These guide display operations enable the user to easily terminate the use of the cleaning apparatus 100 only by following the guide without forgetting to detach the camera fixing unit 23. The present invention is not limited to the operations described in the exemplary embodiment described above, but instead only one of the two guide display operations described above may be carried out. Further, in the present exemplary embodiment, the user selects a combination (course) of cleaning sequences to perform cleaning. However, a part or the whole of the combination of cleaning sequences may be automatically selected and determined by the control unit 10. For example, the control unit 10 selects a combination (course) of cleaning sequences based on the information about the number and size of foreign particles obtained from the image information before cleaning acquired in the first check sequence, and the information about the previous cleaning time and the number and size of foreign particles after cleaning obtained at that time received from the camera 200 or stored in the memory 16 in association with an identification (ID) of the attached camera 200. More specifically, after a lapse of a predetermined period or longer from the previous cleaning time, at least one of the type of cleaning to be executed and the number of cleaning operations is set to a greater value. If the number of foreign particles with a size larger than or equal to a limit value is greater than or equal to a predetermined number, it is determined that more elaborate cleaning is required, and thus at least one of the cleaning type and the number of cleaning operations is set to a greater value. In addition, the type of foreign particles (dry foreign particles or greasy dirt) may be determined in advance by a known image analysis method such as machine leaning for leaning correct images and incorrect images for various types of foreign particles, and the determined type may be reflected in the selection of at least one of the cleaning type and the number of cleaning operations. Even when the automatic course selection by the cleaning apparatus 100 (control unit 10) as described above is set, the cleaning apparatus 100 may be configured to be able to display a check screen display for checking contents of the selected and determined course by the control unit 10 and to perform a correction setting for correcting a part of the cleaning sequence and the check sequence in the course.

Figure 7:
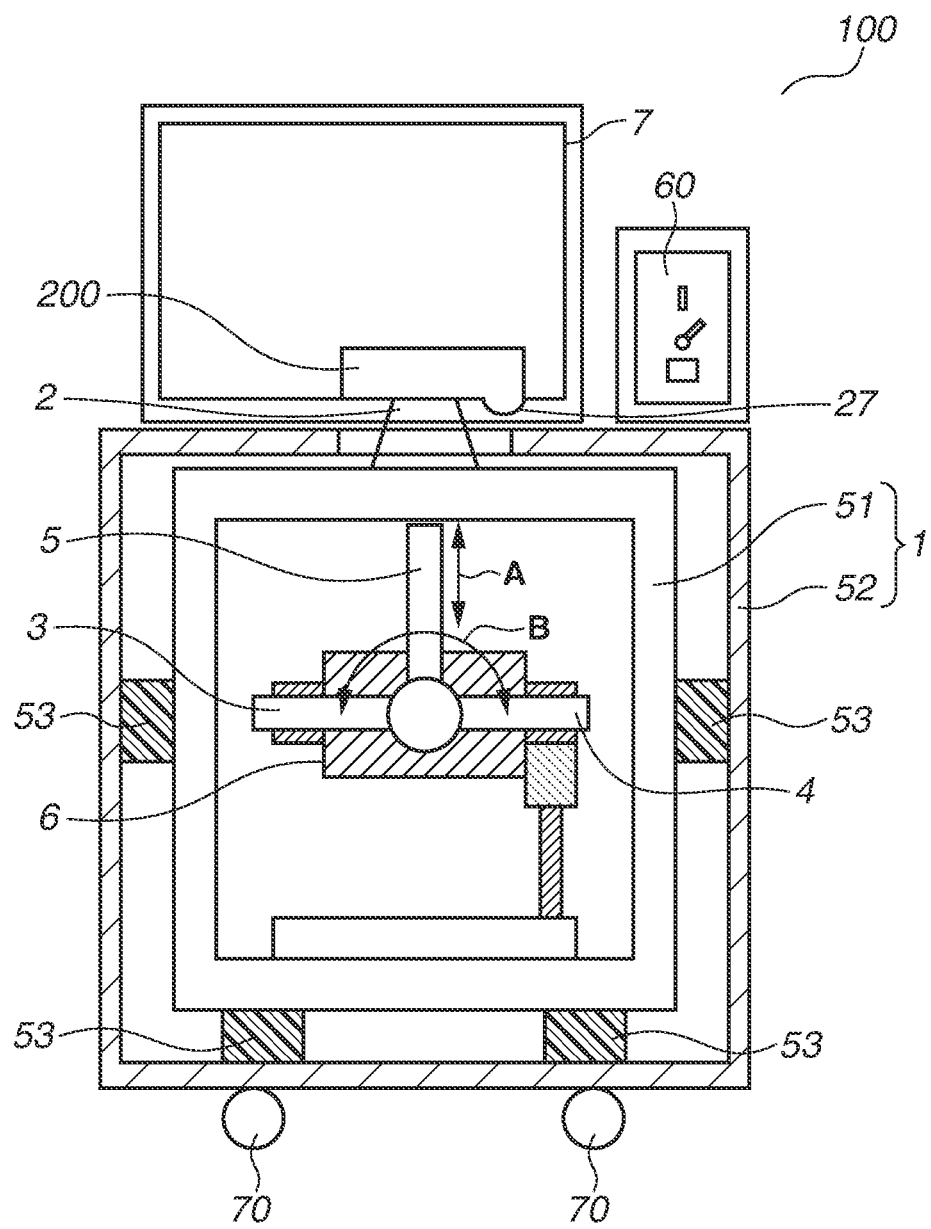
FIG. 7 is a diagram illustrating a configuration example of the cleaning apparatus according to the exemplary embodiment.

Next, the configuration of the cleaning apparatus 100 according to the present exemplary embodiment will be described in detail with reference to FIG. 7 and FIGS. 8A to 8D. FIG. 7 is a front schematic view illustrating the cleaning apparatus 100 according to the present exemplary embodiment.

The main body 1 includes at least two housings. A first housing 51, which is one of the two housings, includes the fixing unit 2, the check unit 3, the first cleaning unit 4, the second cleaning unit 5, and the movable pedestal 6, which are members directly related mechanically to each cleaning unit or the cleaning operation of cleaning unit. In the present exemplary embodiment, as illustrated in FIG. 1C, the control unit 10 and the air filter 11 are attached to the first housing 51 on the rear surface thereof.

The other housing, i.e., a second housing 52 includes components that are not directly related to the cleaning operation of cleaning unit, such as the display unit 7, a fee-payment unit 60, and a movement assist unit 70, and that is connected to the first housing 51 via a support member 53 and supports the first housing 51. The fee-payment unit 60 is used for the user to pay fees for usage of services, such as a cleaning service using the cleaning apparatus 100, or receive the fee, when the cleaning apparatus 100 according to the present exemplary embodiment is installed in a store or the like. The movement assist unit 70 includes wheels for moving the entire cleaning apparatus 100, typified by a caster, and facilitates the movement of the entire cleaning apparatus 100.

In this case, the first housing 51 is surrounded by the second housing 52 and is elastically supported by the second housing 52 via the support member 53, which is made of hard vinyl chloride, in the gravity direction and the horizontal direction. Further, the first housing 51 is formed of a member or shape with a rigidity higher than that of the second housing 52. With this configuration, even when an external force from the outside of the cleaning apparatus 100 is received by the second housing 52, the force is dispersed due to the rigidity of the second housing 52 and the elastic force of the support member 53, so that the first housing 51 is less likely to be deformed. As a result, an advantageous effect that adverse effects on the cleaning operation are reduced, can be obtained.

Further, the fixing unit 2 illustrated in FIG. 7 is directly supported by the first housing 51 and is configured so as to project from the second housing 52. With this configuration, if a grip portion 27, which projects toward the camera 200, is provided, the fixing unit 2 can be connected to the cleaning apparatus 100 without causing any problem. Further, since the camera 200 is directly supported by the first housing 51 via the fixing unit 2, even when an external force is applied to, especially, the second housing 52 of the cleaning apparatus 100, the force is less likely to be applied to the components that are directly related to cleaning, and thus adverse effects of the external force on the cleaning configuration and the cleaning operation can be reduced.

The fixing unit 2 need not necessarily project toward the second housing 52, and may have any configuration as long as the circumferential portion of the fixing unit 2 is formed relatively low not to prevent the grip portion 27 from attaching to the fixing unit 2.

Figure 8A:
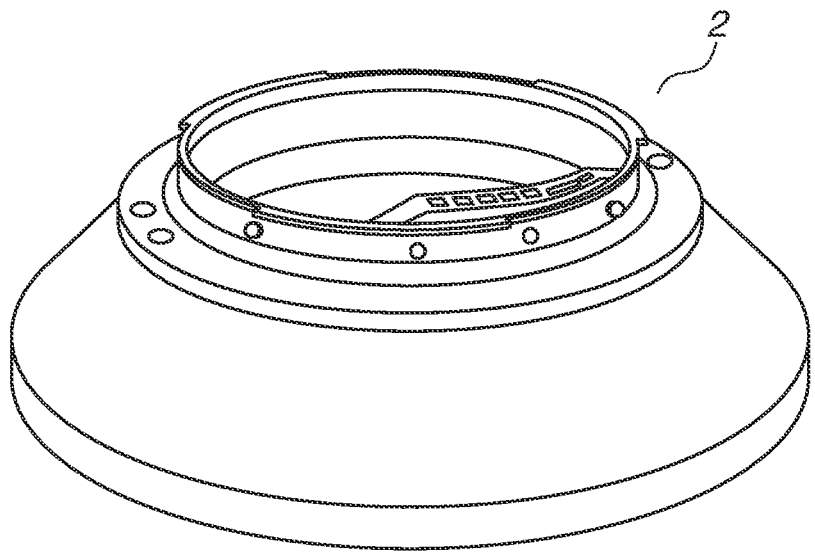
FIGS. 8A, 8B, 8C, and 8D are diagrams illustrating configuration examples of a fixing unit, a check unit, a first cleaning unit, and a second cleaning unit, respectively, according to the exemplary embodiment.

FIGS. 8A to 8D illustrate configuration examples of the fixing unit 2, the check unit 3, the first cleaning unit 4, and the second cleaning unit 5, respectively, according to the present exemplary embodiment. FIG. 8A is an external perspective view of the fixing unit 2. The fixing unit 2 is provided with a mount portion having a shape matching the camera 200 to be connected to an upper portion of a base, which is formed in a tapered shape or a truncated cone shape. The mount portion is provided with a connection terminal capable of detecting a connection with the camera 200 and communicating with the camera 200, like an interchangeable lens or the like to be connected to a general camera. In the present exemplary embodiment, an annular illumination member is also provided on the back side of the base, and this illumination member is used to monitor the cleaning state based on an output from the image sensor 22 by irradiating the sensor surface with light during cleaning. As described above, the fixing unit 2 may be detachably attached to the first housing 51, and may be configured to be replaced with the fixing unit 2 including a mount that is compatible with different manufacturers or models of cameras to be cleaned.

Figure 8B:
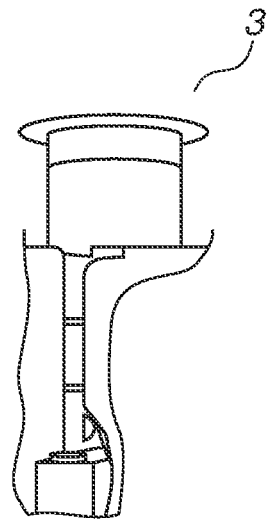

FIG. 8B illustrates a configuration example of the check unit 3. The check unit 3 has a configuration in which a bar-like support member fixed to the movable pedestal 6 and including a wire is provided with a point light source (with a small hole formed at a cylindrical leading end (upper surface) covering the light source), such as an LED, so that light is irradiated on an extension of the support member.

Figure 8C:
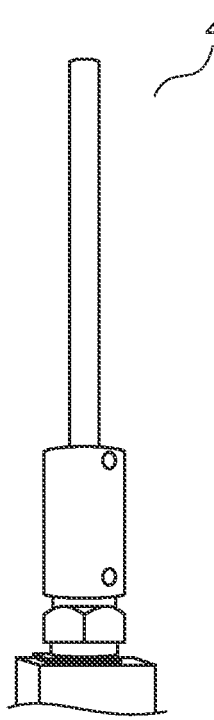

FIG. 8C illustrates a configuration example of the first cleaning unit 4. The first cleaning unit 4 includes a cylindrical injection port, and blows air from a leading end thereof. As described above, the air is injected into the air filter 11 from an external pump or the like through the intake port 12, and the air is supplied to the first cleaning unit 4 through a pipe disposed in the cleaning apparatus 100 in a state where foreign particles or oil is reduced.

Figure 8D:
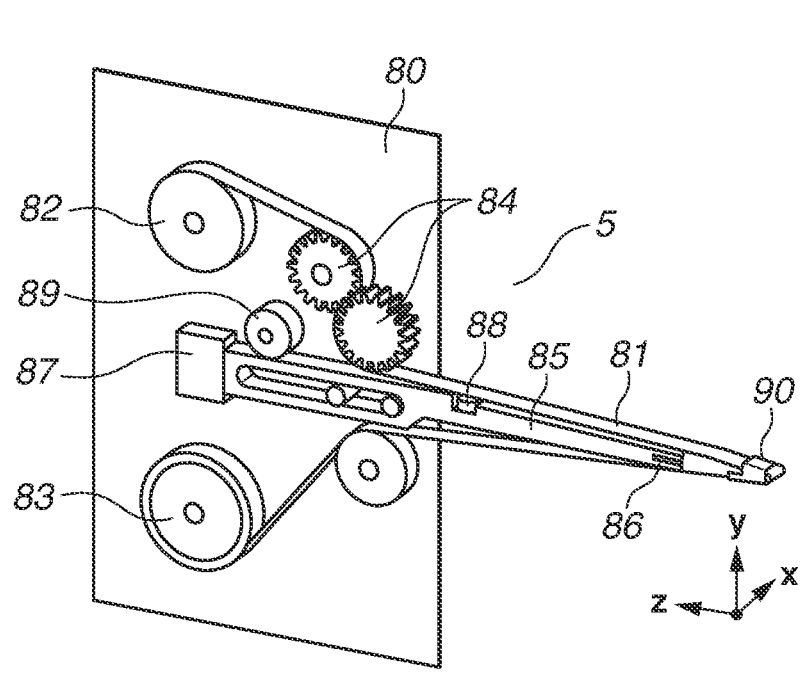

FIG. 8D illustrates a configuration example of the second cleaning unit 5. A base plate 80 is provided with a fiber tape 81 including woven microfibers used to wipe off foreign particles, a winding portion 82 around which the fiber tape 81 is wound, a feed portion 83 for feeding the fiber tape 81, and a gear portion 84 for controlling the amount of winding of the tape. A leading end core portion 86, which is formed of metal, is attached to a leading end of a core 85, and an elastic member 87 urges the core 85 in a driving direction. A vibrator 88 applies vibration to the leading end core portion 86. A roller 89 is a member formed of metal and comes into contact with the core 85 to regulate the movement of the core 85 in the driving direction. A guide member 90 is a member that regulates the movement of the fiber tape 81 and is molded with resin. The vibrator 88 generates vibration by a piezoelectric element or an actuator and provides the leading end core portion 86 with micro-vibration in a Z-direction during the cleaning operation, thereby making it possible to reduce a frictional force generated between the fiber tape 81 and the image sensor surface 30 and achieve a smooth cleaning operation. Further, since the vibration generated by the vibrator 88 reduce frictional force with the fiber tape 81, the guide member 90, and the leading end core portion 86, a smooth winding operation can be performed also during winding of the fiber tape 81.

Now, an operation to be performed during cleaning by the second cleaning unit 5 will be described in detail. First, the fiber tape 81 is wound by the gear portion 84 while the fiber tape 81 is caught in the gear portion 84, and an unused portion of the fiber tape 81 is drawn from the feed portion 83 and used for cleaning at the leading end core portion 86. A used portion of the fiber tape 81 is wound around the winding portion 82. The movement of the fiber tape 81 is regulated by the guide member 60, and the fiber 81 is wound while the state where the fiber tape 81 is laid on the leading end core portion 86 is maintained. When cleaning is started, the fiber tape 81 that is laid on the leading end core portion 86 is pressed against the image sensor 11 and the operation of wiping off foreign particles is carried out. In this case, the core 85 can be caused to slide in a pressing direction (Z-direction in FIG. 4D), and cleaning is performed by appropriate pressing while squashing the elastic member 87. Since an appropriate pressing force is applied to the image sensor surface 30 by the elastic member 87, foreign particles can be removed without damaging the image sensor 11. Further, the metallic roller 89 is in contact with the core 85 also during movement, so that the electrical connection between the camera communication unit 24 and the core 85 is ensured via the metallic roller 89. During the wipe operation, the vibrator 88 attached to an upper portion of the core 85 vibrates the core 85, thereby reducing the frictional force between the fiber tape 81 and the image sensor surface 30, which are pressed against each other, and achieving a smooth cleaning operation while preventing the fiber tape 81 from being caught on the image sensor surface 30.

As described above, according to the present exemplary embodiment, it is possible to provide the cleaning apparatus that receives a setting for a combination of cleaning operations to be performed by a plurality of different types of cleaning units, and controls the cleaning order and the number of cleaning operations of each cleaning unit based on the received setting, to thereby clean the detection surface. Consequently, it is possible for the user to clean the detection apparatus with a simple operation.

Further, in the present exemplary embodiment, cleaning by the second cleaning unit that performs wipe cleaning in a contact state is performed, after cleaning is performed by the first cleaning unit that performs cleaning by wind pressure (injection) on the detection surface of the detection element that detects a physical quantity. In this way, various types of foreign particles adhering to the detection surface can be appropriately removed. In addition, cleaning in a non-contact manner is performed again after wipe cleaning, thereby making it possible to remove fibers of the wiping tool attached during the wipe cleaning operation, foreign particles remaining after cleaning, and foreign particles present at the periphery of the detection surface. Further, images of the detection surface are obtained by capturing images of the detection surface before or after cleaning, or before and after cleaning, which makes it possible to check the state of the detection surface before or after cleaning, or before and after cleaning. In this case, the use of a point light source as the light source that irradiates the detection surface with light makes it possible to acquire images that have a deeper depth of field and facilitate the recognition of foreign particles. Therefore, foreign particles remaining on the detection surface can be visually observed or detected easily. In addition, the state of foreign particles can be analyzed by analyzing the captured images of the detection surface, and thus it is possible to present the number of foreign particles and perform display with enhanced visibility for foreign particles.

Furthermore, according to the present exemplary embodiment, the cleaning apparatus including a plurality of cleaning units capable of performing a plurality of cleaning sequences can remove various types of foreign particles adhering to the detection surface of the detection apparatus including the detection element.

The exemplary embodiments of the present invention have been described above. However, the present invention is not limited to these exemplary embodiments, and various modifications and changes can be made within the scope of the invention.

Other Exemplary Embodiments

The object of the present invention can also be achieved by the following methods. Specifically, a storage medium storing a software program code in which procedures for implementing the functions according to the exemplary embodiments described above are described is supplied to a system or apparatus. Then, a computer (or a CPU, a microprocessor unit (MPU), etc.) of the system or apparatus reads out the program code stored in the storage medium and executes the program code.

In this case, the program code read from the storage medium implements new functions according to the present invention, and the storage medium storing the program code and the program constitute the present invention.

Examples of the storage medium for supplying the program code include a flexible disk, a hard disk, an optical disk, and a magneto-optical disk. In addition, a compact disc read-only memory (CD-ROM), a CD-recordable (CD-R), CD-rewritable (CD-RW), a digital versatile disc (DVD)-ROM, a DVD-random access memory (RAM), a DVD-RW, a DVD-R, a magnetic tape, a nonvolatile memory card, a ROM, and the like can also be used.

Further, the program code read by the computer can be executed to thereby implement the functions according to the exemplary embodiments described above. The present invention also includes a case where a part or the whole of actual processing is executed by an operating system (OS) or the like that runs on the computer based on an instruction from the program code, and the processing implements the functions according to the exemplary embodiments described above.

The present invention also includes the following cases. First, the program code read from the storage medium is written into a memory that is included in a function expansion board inserted into the computer, or a function expansion unit connected to the computer. After that, based on an instruction from the program code, a part or the whole of actual processing is executed by a CPU or the like included in the function expansion board or the function expansion unit.

According to the exemplary embodiments of the present invention described above, it is possible to provide a cleaning apparatus capable of removing various types of foreign particles adhering to a detection surface of a detection element, and a control method for the cleaning apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142902, filed Jul. 30, 2018, which is hereby incorporated by reference herein in its entirety.

What is claimed is:

1. A cleaning apparatus that cleans an image sensor including a detection surface, the cleaning apparatus comprising:
    a first cleaner including a first cleaning portion configured to perform a cleaning operation, and configured to clean the detection surface by using the first cleaning portion;
    a second cleaner including a second cleaning portion of a type different from the first cleaning portion, and configured to clean the detection surface by using the second cleaning portion;
    a driver to which the first cleaner and the second cleaner are attached and configured to move to approach or recede from the detection surface in a state where the first cleaner and the second cleaner are attached to the driver;
    one or more processors; and
    a memory storing instructions which, when executed by the one or more processors, cause the one or more processors to function as:
    a control unit configured to control each of the first cleaner, the second cleaner, the driver, and a display unit,
    wherein the control unit is configured to display, on the display unit, graphical user interfaces indicating settings that are for a cleaning order and/or a number of cleaning operations performed by the first cleaner and the second cleaner, and display, on the display unit, a captured image of the detection surface captured by the image sensor cleaned by one of the first cleaner and the second cleaner,
    wherein the control unit is configured to receive a setting among the settings by a user operation during the control unit displays the graphical user interface indicating the setting, and control the cleaning operation to be performed by the first cleaner and the cleaning operation to be performed by the second cleaner.

2. The cleaning apparatus according to claim 1, wherein the control unit displays, on the display unit, the graphical user interfaces indicating the cleaning order and/or the number of cleaning operations performed by the first cleaner and the second cleaner in a case where the user makes the setting for the cleaning operation to be performed by the first cleaner and the second cleaner.

3. The cleaning apparatus according to claim 2, wherein the control unit displays the graphical user interface which displays a plurality of predetermined combination patterns of different cleaning orders or different number of cleaning operations in a comparable manner.

4. The cleaning apparatus according to claim 1, further comprising a detection unit configured to detect attachment of a detection apparatus including the image sensor to the cleaning apparatus and detachment of the detection apparatus from the cleaning apparatus, wherein the control unit starts the cleaning operation on the detection surface when it has been detected by the detection unit that the detection apparatus is attached to the cleaning apparatus.

5. The cleaning apparatus according to claim 4, wherein the control unit is configured to guide the detection apparatus to be attached to the cleaning apparatus, and inform the user that it has been detected by the detection unit that the detection unit that the detection apparatus is attached to the cleaning apparatus.

6. The cleaning apparatus according to claim 4, wherein the control unit is configured to guide the detection apparatus to be detached from the cleaning apparatus after the cleaning operation, and inform the user that it has been detected by the detection unit that the detection apparatus is detached from the cleaning apparatus.

7. The cleaning apparatus according to claim 1, wherein the control unit is configured to display, on the display unit, information indicating a state of the cleaning apparatus.

8. The cleaning apparatus according to claim 7, wherein the information indicating the state of the cleaning apparatus includes one of a temperature of the control unit and a temperature of an area near the detection surface.

9. The cleaning apparatus according to claim 4, wherein the control unit is configured to display information indicating a state of the detection apparatus on the display unit.

10. The cleaning apparatus according to claim 9, wherein the information indicating the state of the detection apparatus includes at least one of image sensor information about the image sensor of the attached detection apparatus and a number of cleaning operations performed previously.

11. The cleaning apparatus according to claim 1, wherein the control unit is configured to detect foreign particles from the image and inform a user of a result of the detection.

12. The cleaning apparatus according to claim 11, wherein the control unit is configured to detect foreign particles from the image, and inform the user of at least one of positional information about an area in which the foreign particles are detected and a number of remaining foreign particles.

13. The cleaning apparatus according to claim 1, wherein the control unit is configured to cause the image sensor to capture an image of a state where the detection surface is cleaned when a cleaning operation is performed by the first cleaner and the second cleaner, and sequentially display the image on the display unit.

14. The cleaning apparatus according to claim 1, wherein the control unit is configured to cause one of the first cleaner and the second cleaner to perform the cleaning operation on the detection surface by controlling the driver to cause the one of the first cleaning portion and the second cleaning portion to approach the detection surface relatively with respect to the other one of the first cleaning portion and the second cleaning portion and to cause the approached one of the first and second cleaning portions to clean the detection surface, and by controlling the approached one of the first and second cleaning portions to retract from the detection surface.

15. The cleaning apparatus according to claim 1, wherein the control unit is configured to drive, based on image sensor information about the image sensor, the driver to control a distance between the detection surface and the first cleaning portion or the second cleaning portion, to clean the detection surface.

16. The cleaning apparatus according to claim 1, wherein the first cleaner includes an injection port serving as the first cleaning portion through which air is blown, and cleans the detection surface to be cleaned by the air.

17. The cleaning apparatus according to claim 1, wherein the second cleaner includes a member including a wiping tool configured to wipe off foreign particles in a state where the wiping tool is in contact with the detection surface as the second cleaning portion.

\* \* \* \* \*